Oct. 8, 1946. G. NORMAN 2,408,807
KNITTING METHOD AND MACHINE
Filed Sept. 16, 1944 15 Sheets-Sheet 1

INVENTOR:
George Norman,
BY Paul & Paul
ATTORNEYS.

Oct. 8, 1946.   G. NORMAN   2,408,807
KNITTING METHOD AND MACHINE
Filed Sept. 16, 1944   15 Sheets-Sheet 2
FIG_2_
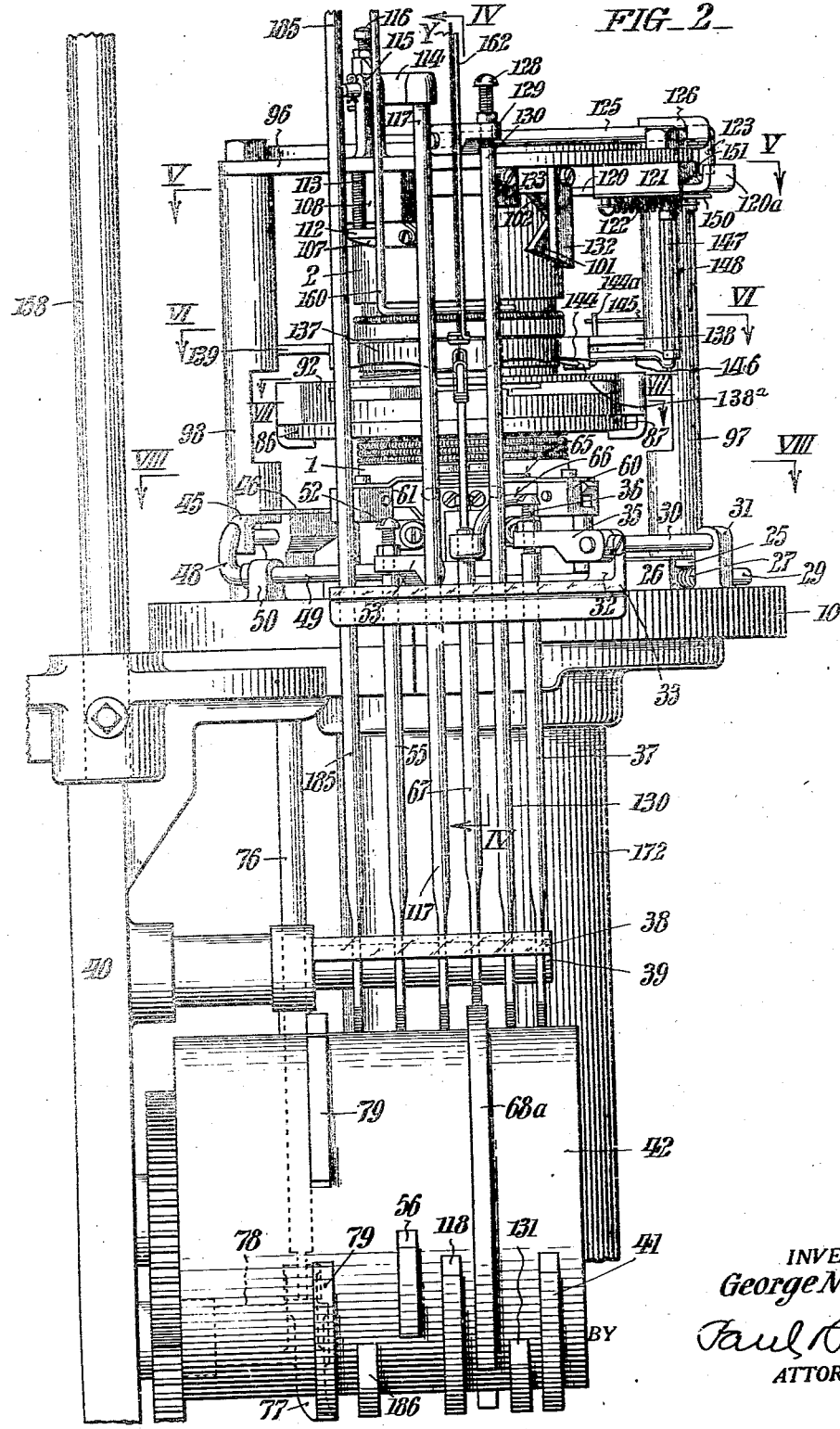
INVENTOR:
George Norman,
BY
Paul & Paul
ATTORNEYS.

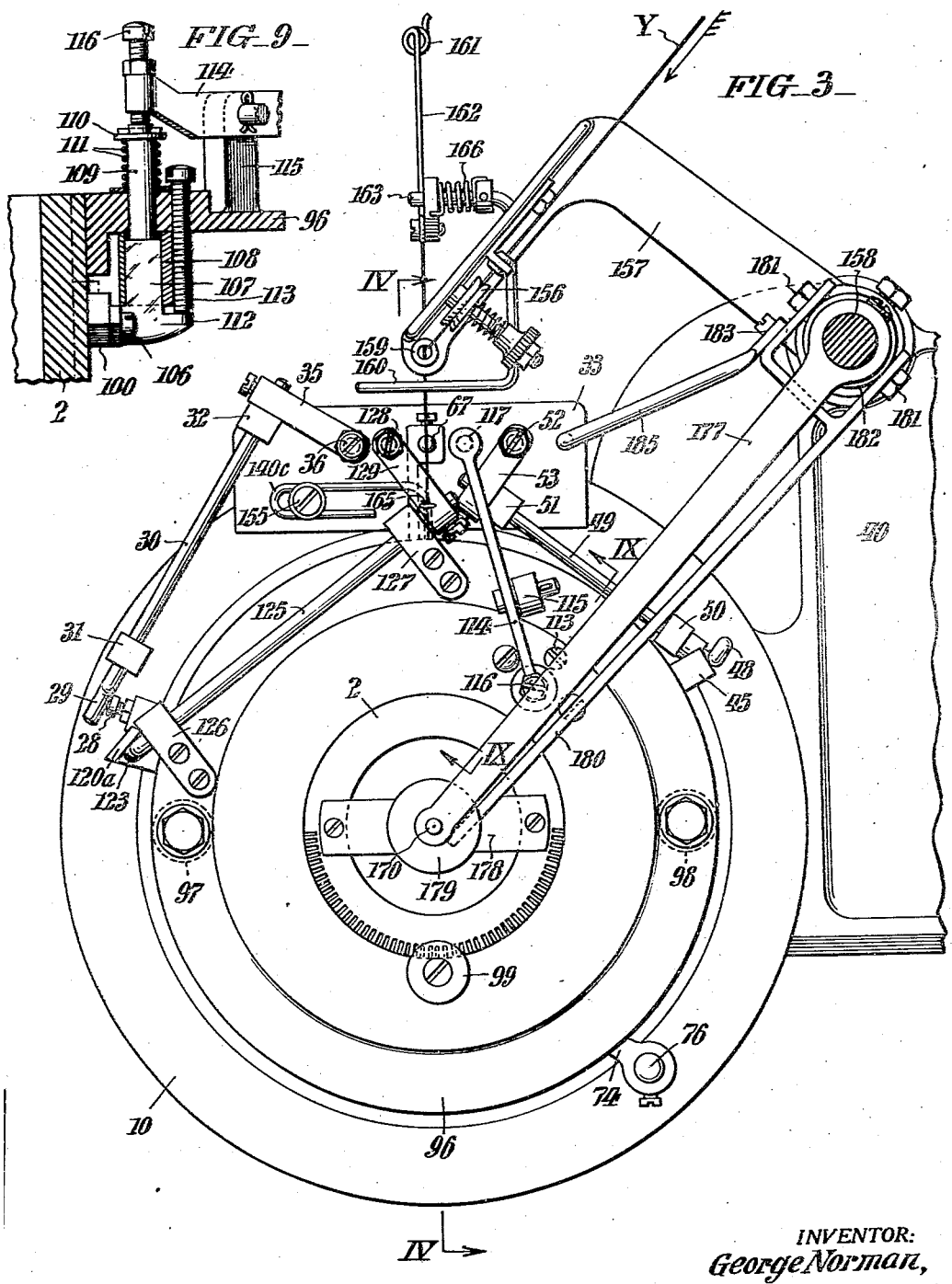

Oct. 8, 1946. G. NORMAN 2,408,807
KNITTING METHOD AND MACHINE
Filed Sept. 16, 1944 15 Sheets-Sheet 4
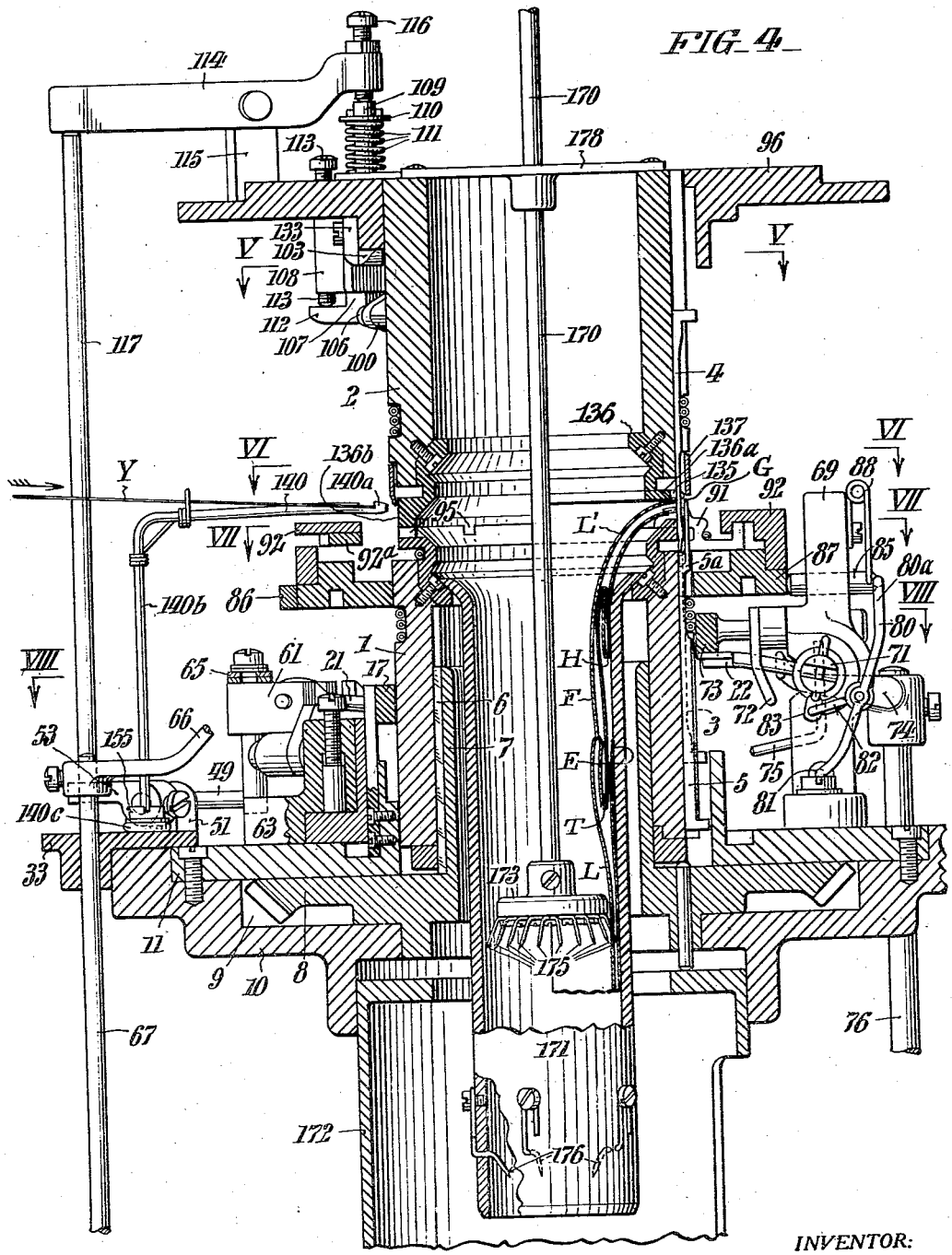
FIG_4_
INVENTOR:
George Norman,
BY Paul & Paul
ATTORNEYS.

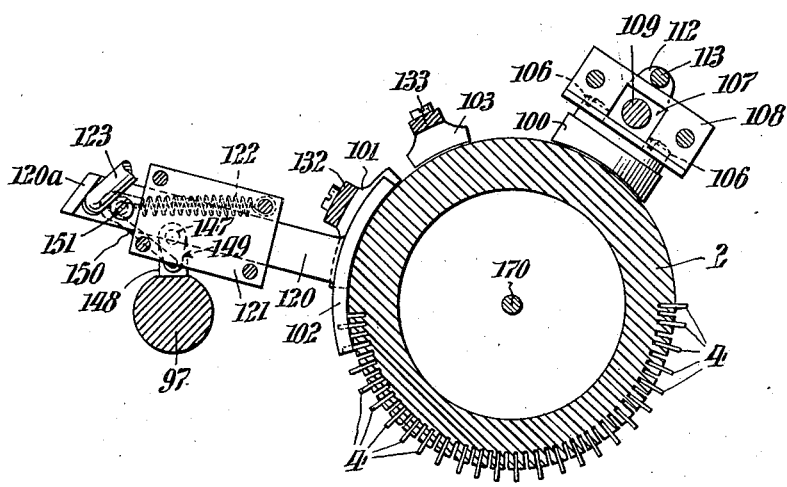
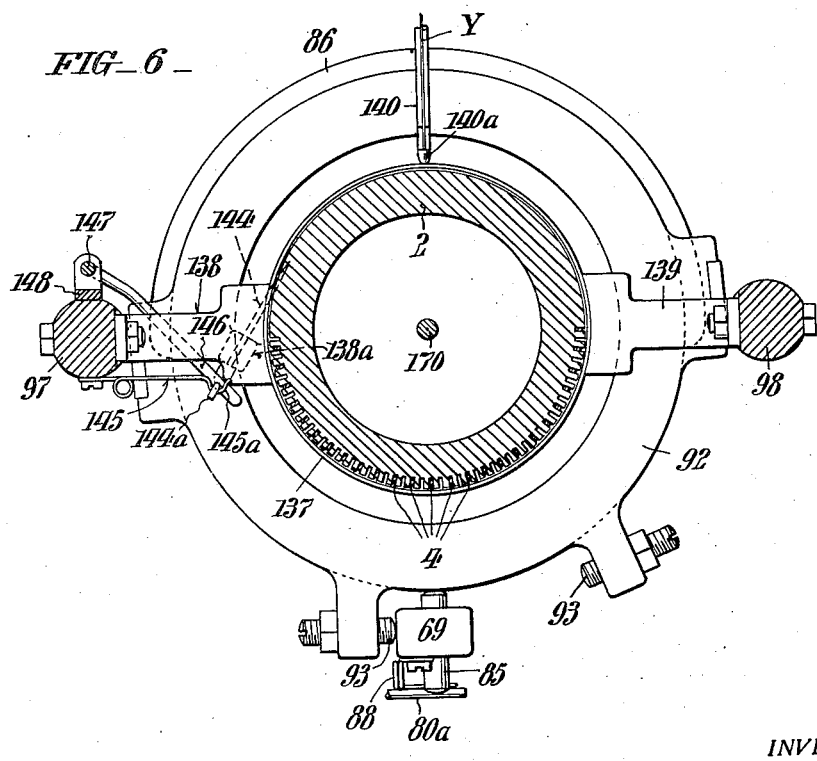

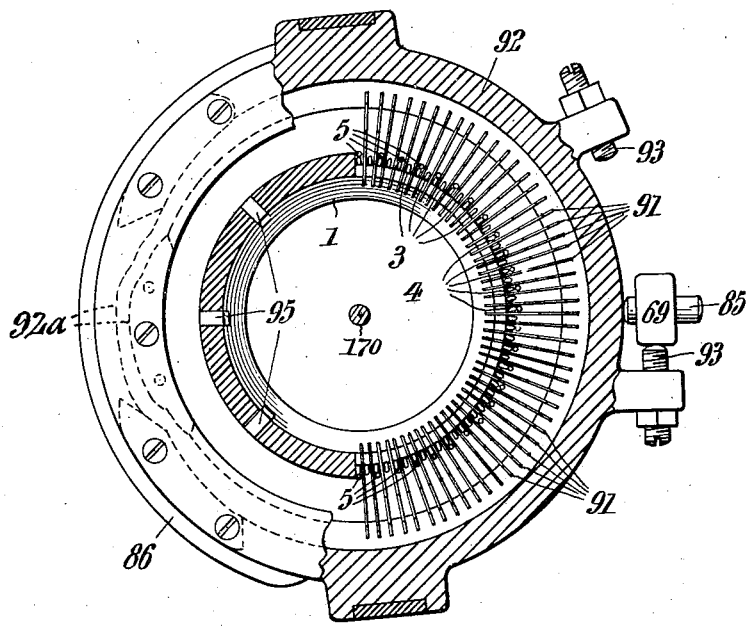
FIG_7_
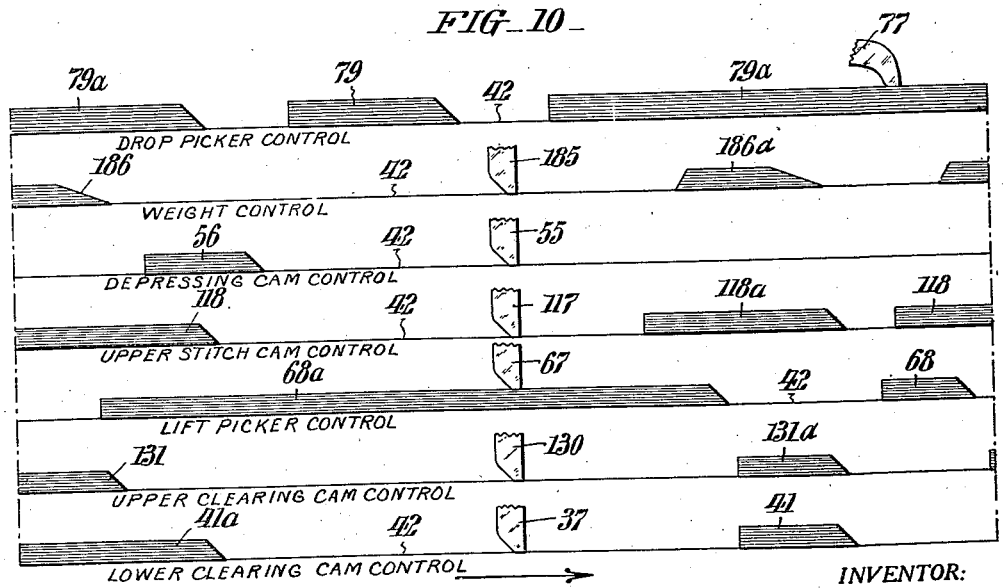
FIG_10_

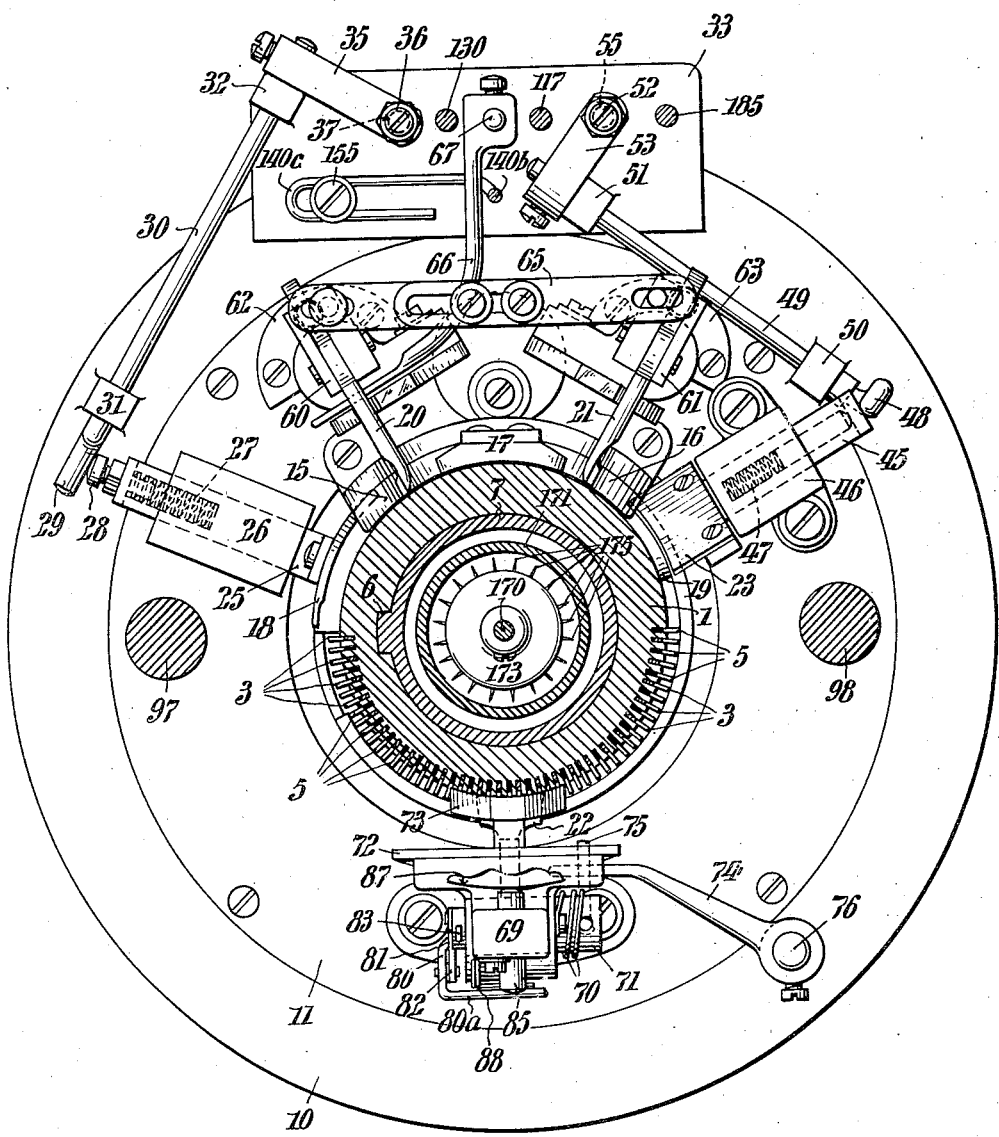
FIG_8_

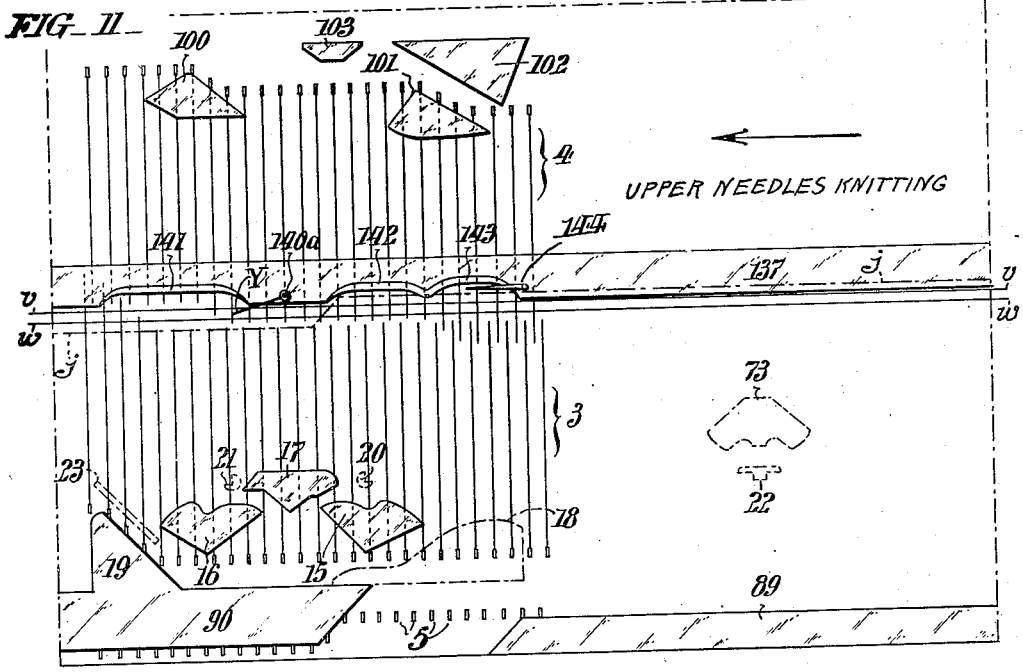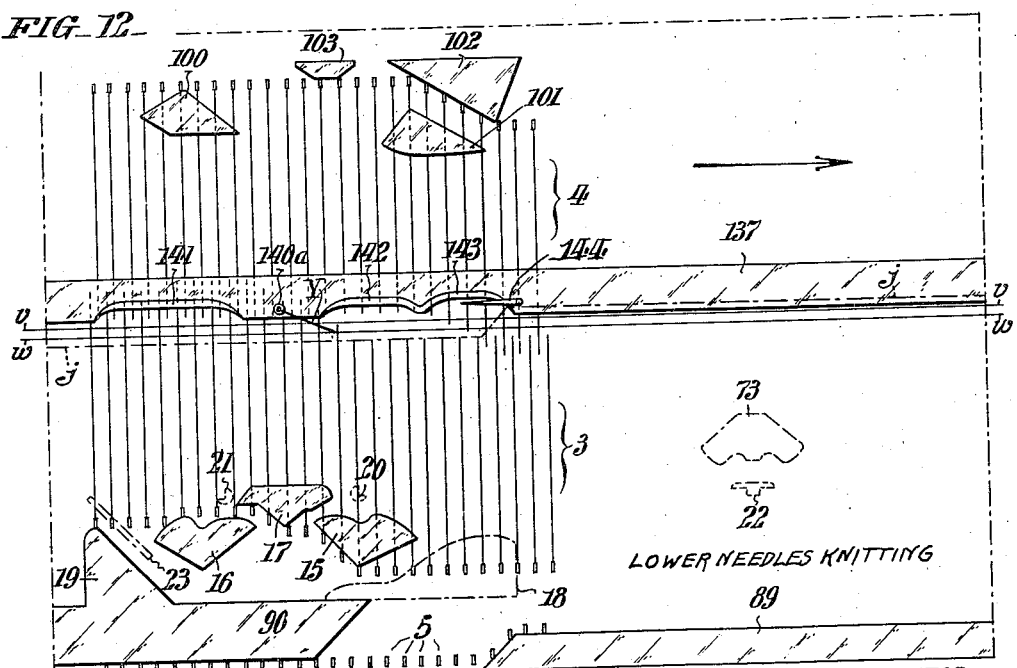

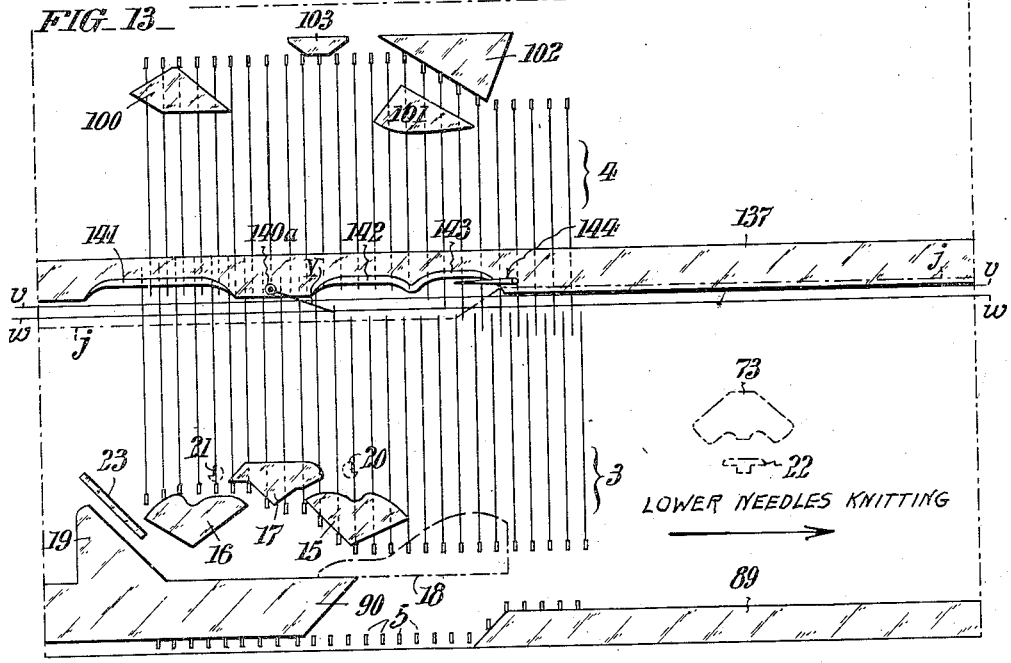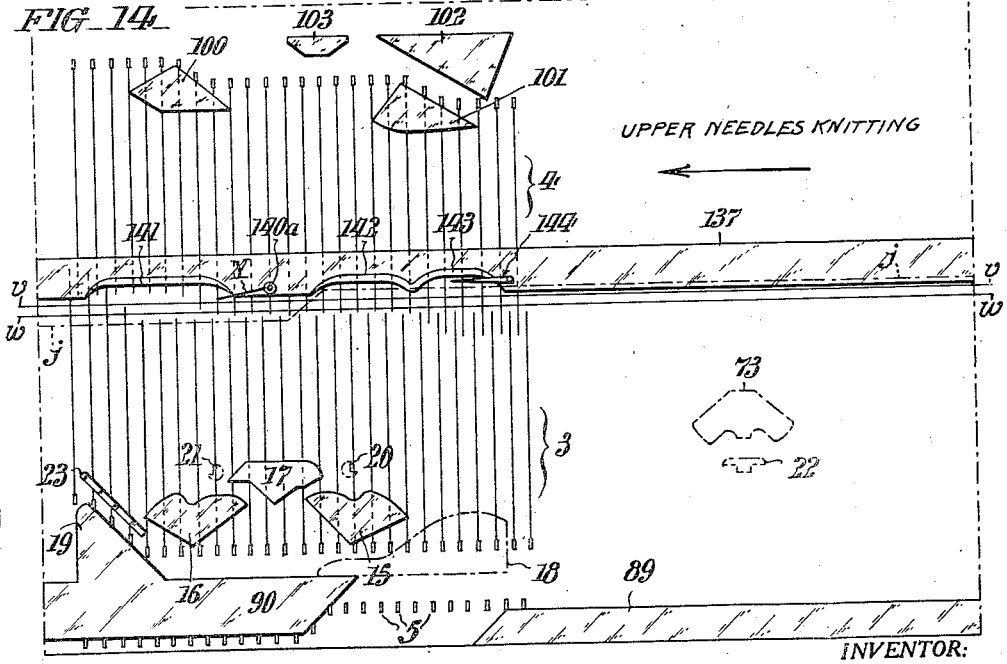

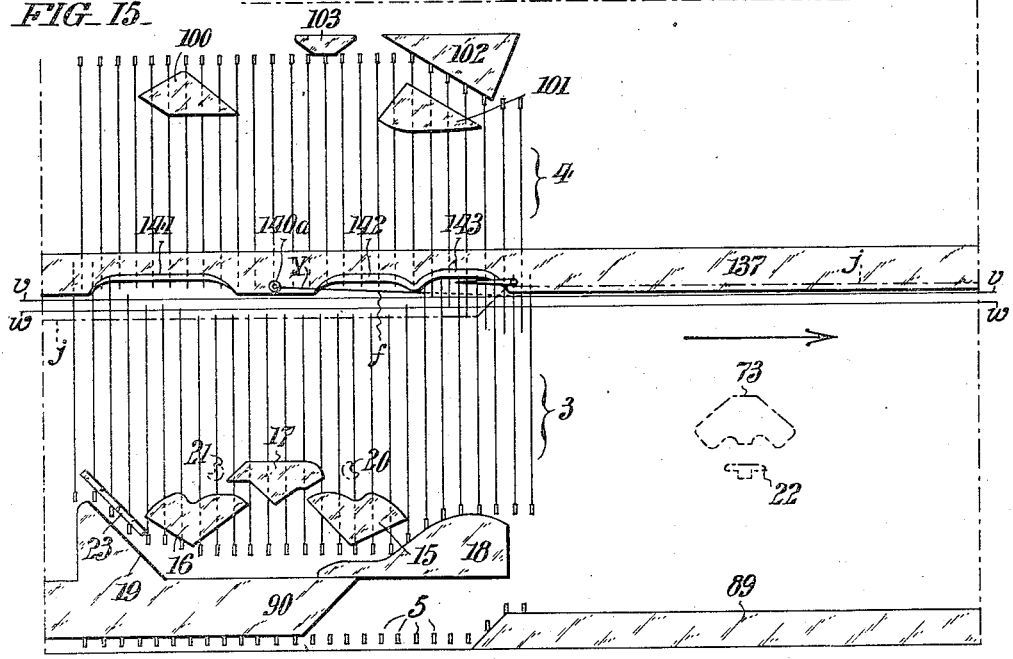
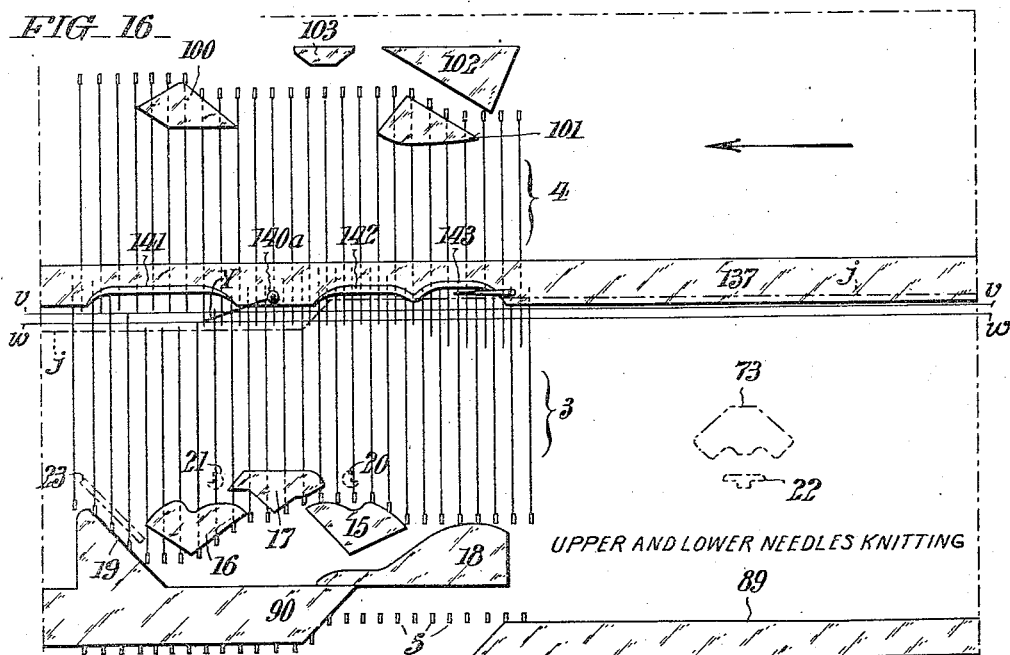

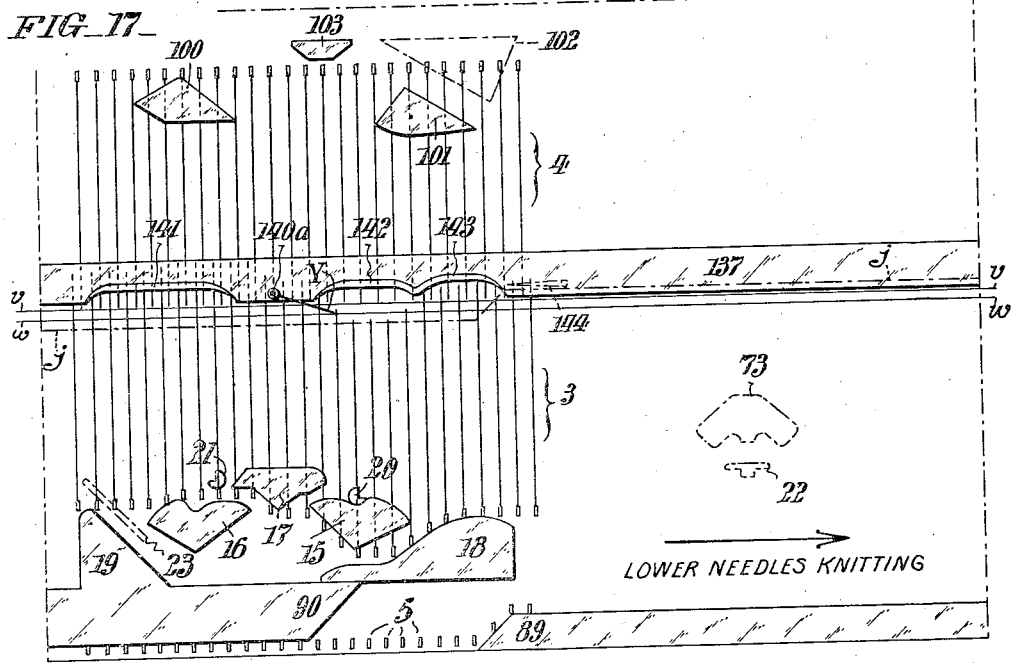
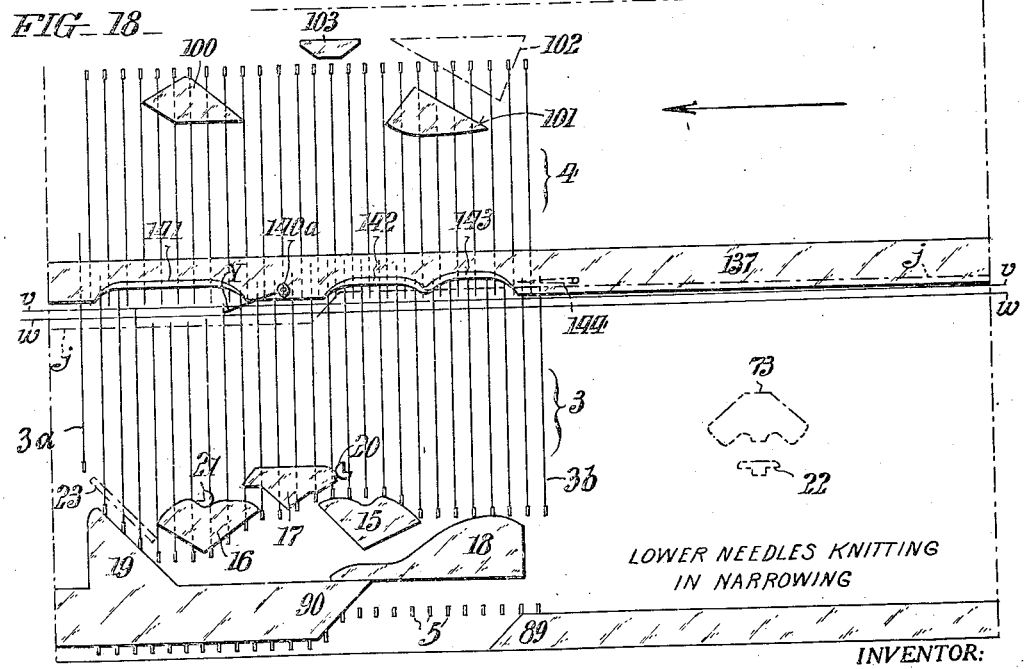

Oct. 8, 1946.    G. NORMAN    2,408,807
KNITTING METHOD AND MACHINE
Filed Sept. 16, 1944    15 Sheets-Sheet 12
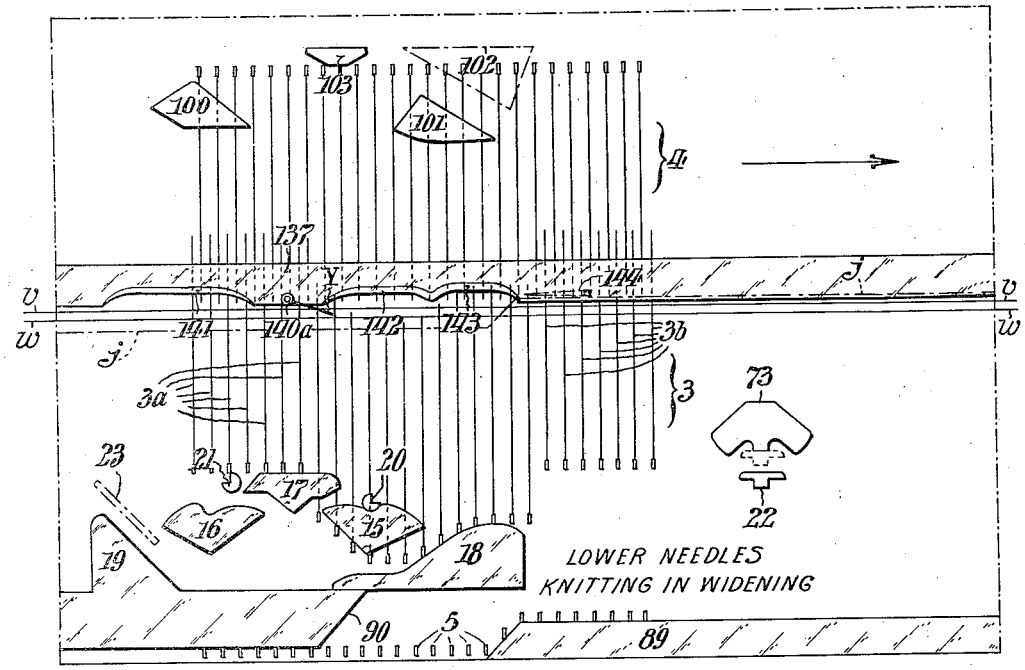
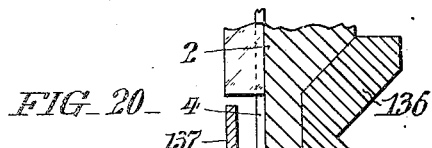
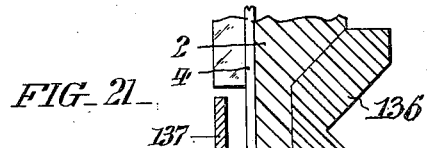
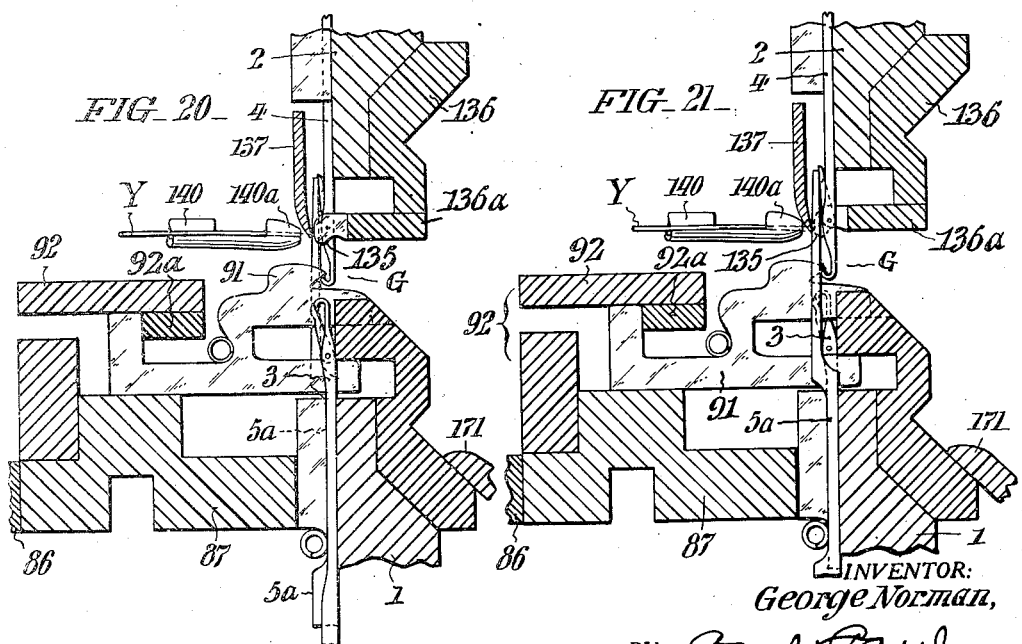
INVENTOR:
George Norman,
BY Paul & Paul
ATTORNEYS.

Oct. 8, 1946. G. NORMAN 2,408,807
KNITTING METHOD AND MACHINE
Filed Sept. 16, 1944   15 Sheets-Sheet 13

INVENTOR:
George Norman,
BY Paul & Paul
ATTORNEYS.

Oct. 8, 1946.   G. NORMAN   2,408,807
KNITTING METHOD AND MACHINE
Filed Sept. 16, 1944   15 Sheets-Sheet 14
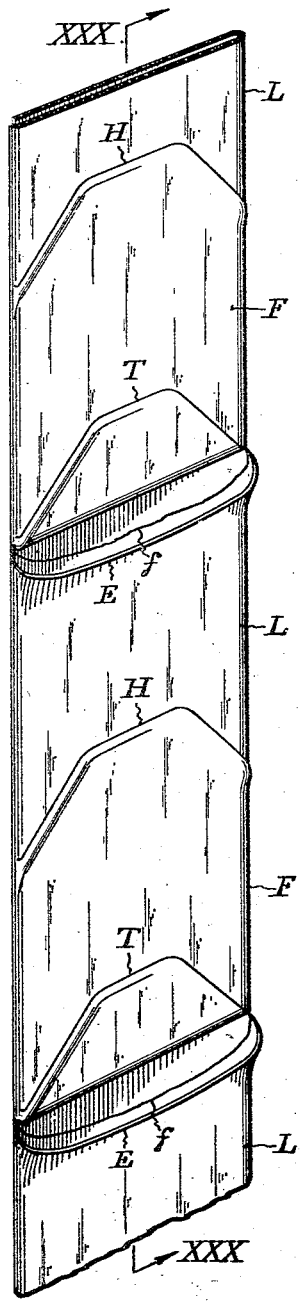
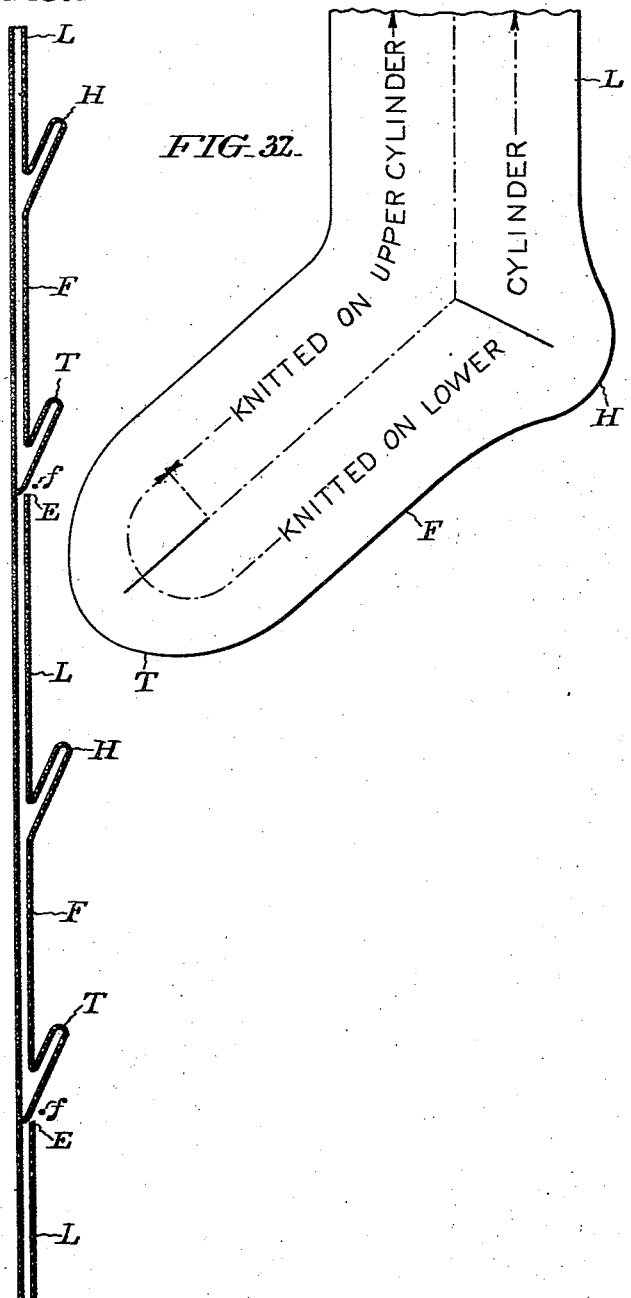
INVENTOR:
George Norman,
BY
ATTORNEYS.

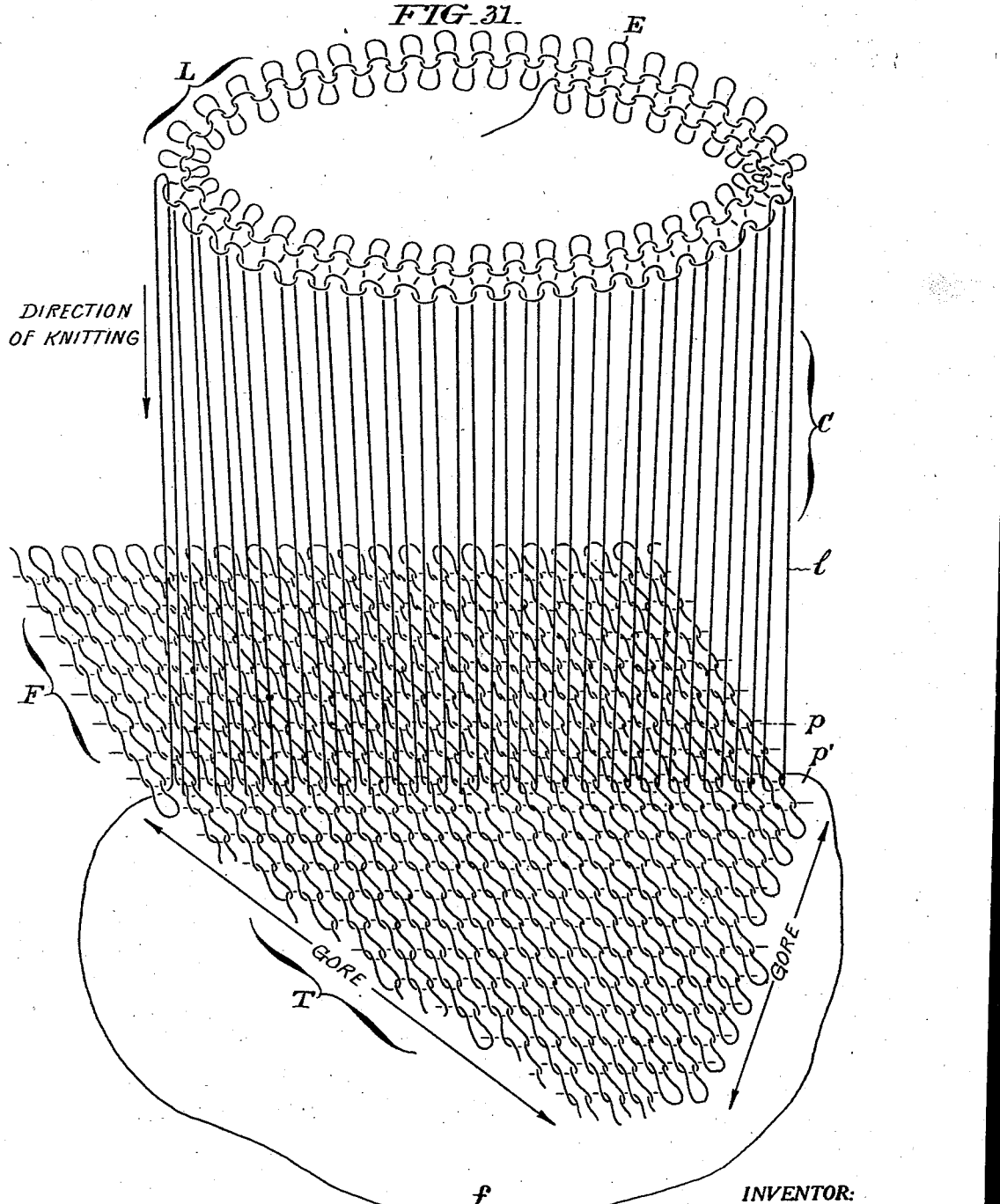

Patented Oct. 8, 1946

2,408,807

UNITED STATES PATENT OFFICE 2,408,807

KNITTING METHOD AND MACHINE

George Norman, Griffin, Ga., assignor to Spalding Knitting Mills, Griffin, Ga., a corporation of Georgia Application September 16, 1944, Serial No. 554,350

26 Claims. (Cl. 66—1)

This invention relates to knitting methods and machines. More specifically, it is concerned with the knitting of seamless hosiery and with circular machines for producing such hosiery.

With pre-existent methods and machines, the legs and instep portions of the stockings are ordinarily formed by round and round knitting upon a circle of needles and the heel and toe pockets fashioned by reciprocatory knitting, with incidental widening and narrowing usually upon half the circle of needles while the remaining needles temporarily hold their loops, the stockings being discharged from the machine with the toe pocket open. To close the toe pockets, it is necessary to unite the raw edges of the fabric at the pockets by a separate looping operation which entails employment of skilled help and accordingly adds considerably to the cost of the production.

My invention is directed in the main toward overcoming the above drawbacks. In other words I aim to make it possible to effect toe closure automatically incident to production of the stockings in the machine so that the necessity for subsequent looping is entirely obviated.

Another object of my invention is to enable toe closure to be accomplished with attendant joinder of one stocking to the next after the manner of string work, in such a way that upon cutting and drawing out a portion of the knitting yarn constituting a course of loops in the region of the juncture of contiguous stocking blanks of the string, separation of the blanks is effected directly at the toe closing courses.

For the purpose of carrying out my improved method of knitting, I have devised a novel automatic machine which, as hereinafter more fully disclosed, has two coaxial superposed cylinders each with a series of needles extending approximately half way around it, the needles of one group alternating with those of the other group and being arranged in opposing relation. Throughout the knitting, the cylinders are reciprocated or oscillated in unison. During formation of the leg and instep portions of a stocking, one group of the needles knits as the cylinders turn in one direction, and the other group of needles knits as the cylinders turn in the opposite direction with resultant production of tubular work. The heel and toe pockets are formed by narrowing and widening incident to oscillatory knitting upon one group of the needles while the other group is idled. At starting of each toe pocket, both groups of needles are simultaneously actuated to form a course by which the pocket is ultimately closed. Thereupon another course is knit on one group of needles as the fabric is cast from the other group, said course forming the removable connection between a pair of adjacent blanks of the string product at the region of toe closure of one of such blanks.

Other objects and advantages of my invention will appear from the following detailed description of the attached drawings, wherein Fig. 1 is a fragmentary view in side elevation of a knitting machine conveniently embodying the present improvements and suitable for carrying out my novel method of continuously producing seamless stocking blanks with closed toe pockets in string form.

Fig. 2 is a similar view of the rear of the machine, i. e., showing it as it appears when observed from the left of Fig. 1.

Fig. 3 is a plan section taken as indicated by the angled arrows III—III in Fig. 1.

Fig. 4 is an axial section of the machine taken as indicated by the angled arrows IV—IV in Figs. 2 and 3.

Figs. 5, 6, 7 and 8 are horizontal section views taken as indicated respectively by the angled arrows V—V, VI—VI, VII—VII and VIII—VIII in Figs. 1, 2 and 4.

Fig. 9 is a fragmentary detail sectional view taken as indicated by the angled arrows IX—IX in Fig. 3.

Fig. 10 is a linear development of the controlling or timing cam drum of the machine.

Fig. 11 is a linear development of the needle actuating cams looking from the outside of the two needle cylinders and showing how one half of a course of fabric of the leg or instep portion of a stocking is knitted by the upper cylinder needles during rotative movement of said cylinders in one direction.

Figs. 12–19 are views similar to Fig. 11 showing the action of the needles and their cams during different succeeding phases of the knitting in the production of a stocking blank in accordance with my improved method.

Figs. 20 and 21 are fragmentary vertical detail sectional views on a larger scale corresponding to Fig. 4 but taken at different points circumferentially of the two superposed needle cylinders.

Fig. 29 is a perspective view of the string work as it comes from the machine.

Fig. 30 is a longitudinal sectional view of the string taken as indicated by the angled arrows XXX—XXX in Fig. 29.

Fig. 31 is a fragmentary diagrammatic view showing the knitted fabric at the region of connection between two adjacent stocking blanks; and Fig. 32 shows one of the stockings after detachment from the string.

Figure 1:
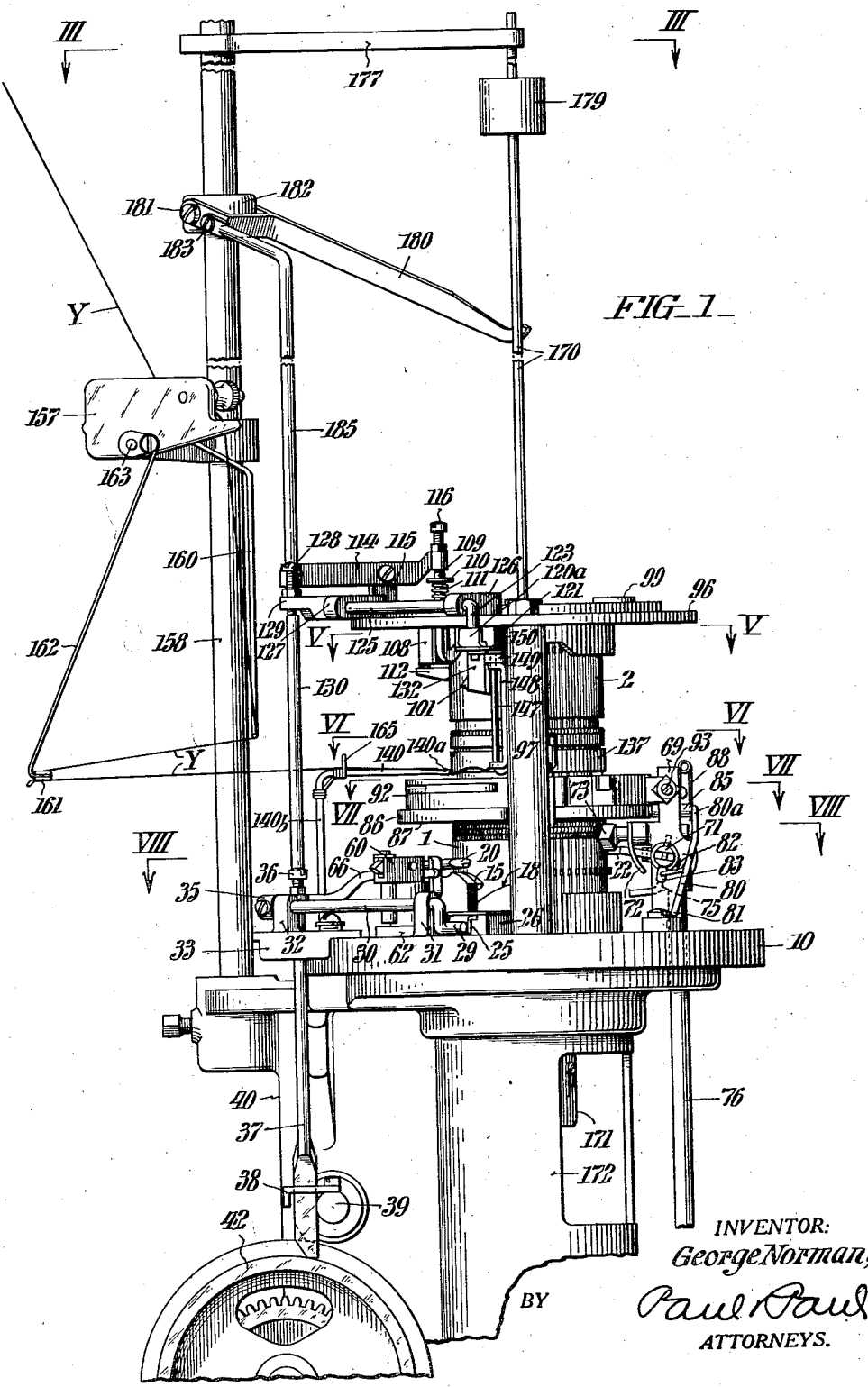

With more specific reference now to these illustrations, it will be noted that my improved knitting machine has two axially superposed cylinders 1 and 2 which are respectively provided substantially half way around them with longitudinal grooves. As shown in Figs. 5 and 8 alternate grooves of the lower and upper cylinders 1 and 2 are occupied by latch needles 3 and 4 all having butts of the same length, the needle grooves of the upper cylinder being in line with the intermediate grooves of the lower cylinder which latter grooves contain slide jacks 5 operative for a purpose later on explained, see Figs. 4, 5 and 8. As shown in Figs. 20 and 21, the hooks of the lower needles 3 are offset so as to be outward of the hooks of the upper needles 4. Within the circumferential range of the needles, the two cylinders 1 and 2 are spaced by a relatively narrow knitting gap as at G in Figs. 4, 20 and 21. The lower cylinder 1 is suitably secured as by a key-and-slot connection 6 to an upward tubular prolongation 7 on a bevel gear wheel 8 (Fig. 4) which is rotatively supported within an annular depression 9 of the bed 10 of the machine and held in position by a removably fixed cover plate 11. In the operation of the machine, the lower cylinder 1 is constantly reciprocated, each time through substantially 360°, by suitable drive mechanism (not illustrated) connected with the bevel gear 8. This drive mechanism may for example be of the construction shown and described in U. S. Patent 1,148,055, granted to Robert W. Scott on July 27, 1915. The knitting cams for the lower cylinder are likewise generally of the character disclosed in the said Scott patent except as later particularly pointed out, that is to say, they comprise main and auxiliary stitch cams 15 and 16 which are disposed at opposite sides of a top center cam 17, clearing cams 18 and 19, elevating pickers 20, 21 and a drop picker 22. These several pickers are employed in the fashioning of heel and toe pockets, which, in accordance with my invention, are knitted by the lower cylinder needles only, while the upper cylinder needles are idled in a manner also more fully explained later. In addition to the usual cams just described, I have provided a special depressing cam 23 for the lower cylinder needles which will again be referred to. In accordance with my invention the clearing cam 18 is movable radially of the cylinder 1 by virtue of being secured to the inner end of a slide 25 (Fig. 8) with guidance in a bracket 26 affixed to the plate 11. The slide 25 is biased outwardly by a spring 27 and at its rear protruding end carries an adjustable abutment 28 which bears against a crank 29 on the contiguous end of a diagonally-arranged horizontal rock shaft 30. As shown, the shaft 30 is journaled in bearings 31 and 32 respectively on the bed 10 and on an extension plate 33 affixed thereto at the rear of the machine. At its opposite end, the rock shaft 30 has an arm 35 with an adjustable abutment 36 engaged from beneath by a vertical thrust bar 37 which, see Figs. 1 and 2, is guided adjacent its top end in the extension plate 33 and adjacent its bottom end in a fixed guide plate 38 on a supporting bar 39 extending laterally from the machine frame 40. Referring to Figs. 2 and 10, the lower end of the thrust bar 37 is in the path of segmental cam rises 41 and 41a on a control or timing drum 42 by which the functioning of the needle clearing cam, as well as other instrumentalities of the machine yet to be described, is governed, said drum being rotated through a single revolution during each operative or stocking-producing cycle of the machine by mechanism (not shown) which also may be like that disclosed in the Scott patent supra. The special depressing cam 23 for the lower cylinder needles is shiftable radially in and out like the clearing cam 18, being for this purpose secured to a slide 45 (Fig. 8) which has guidance in a fixed bracket 46. The slide 45 is biased outwardly by a spring 47 for maintenance yieldingly in contact with a crank projection 48 at one end of another diagonally disposed horizontal shaft 49 which is rockable in fixed bearings 50 and 51. An adjustable abutment screw 52 in an arm 53 at the opposite end of the rock shaft 49 is engaged from beneath by another vertical thrust rod 55 (Fig. 2) whereof the lower end is in the path of a segmental cam 56 on the control drum 42. As ordinarily, the lifting pickers 20 and 21 are pivoted for up and down movement to vertical axis swivel supports 60 and 61 which are oscillatable in stationary bearing brackets 62 and 63 on the fixed plate 11, and which are connected at the rear by a transverse horizontal link 65. During the knitting of the leg and instep portions of the stockings, the picker 20 is held up out of the way of the butts of the lower cylinder needles by a curved underreaching finger 66 at the top of another vertical thrust rod 67 arranged for actuation by circumferentially spaced segmental cams 68 and 68a on the control drum 42. The drop picker 22 is supported for universal movement as usual by an upstanding post 69, it being biased upwardly by a torsion spring 70 surrounding its horizontal pivot 71 so as to be yieldingly urged toward its invert V-notched guide cam 72 which, together with the guard cam 73, is fixedly secured to said post.

For the purpose of controlling the drop picker 22, I have provided means including a finger 74 which overreaches a radial projection 75 on the horizontal pivot 71 (Fig. 8), said finger being secured to the top of a vertical slide rod 76 passing down through a guide opening in the bed 10. At its lower end, the rod 76 is connected to a lever 77 which is pivoted on a stud 78 projecting laterally from the machine frame 40 with its free end disposed in the path of circumferentially-aligned cam rises 79, 79a on the control drum 42. A special means is also provided according to my invention for positively actuating the drop picker 22 during its operative periods. This special means comprises an arm 80 (Fig. 4), which, at its lower end, is fulcrumed at 81 to one side of the post 69, and which, at an intermediate point, is connected by a link 82 with a crank projection 83 on the horizontal pivot 71 of said picker. At the top, the arm 80 has a lateral extension 80a which engages the outer end of a pin 85 slidable endwise in a guide opening in the post 69, with its inner end lying in the path of a segmental cam 86 (Fig. 6) on the edge of a ring 87 affixed to the lower needle cylinder 1 at the top thereof. The spring shown at 88 in Figs. 4 and 8 serves to yieldingly urge the pin 85 toward the periphery of the ring 87.

Immediately beneath the knitting cams for the lower cylinder 1 are fixed elevating and depressing cams 89 and 90 for the jacks 5 of which the upper ends are offset as at 5a for capacity to engage over the latches of the upper cylinder needles to hold them in open position at certain times during the knitting. Arranged to cooperate in the usual way with the lower cylinder needles 3 in the knitting are web holders 91 which are slidably guided to move in and out between adjacent needles in radial grooves of the ring 87 and which are actuated by suitable cams 92a (Fig. 7) on a superimposed cap ring 92. During the reciprocations of the cylinder 1 the cap ring 92 is allowed a certain amount of free rotative play as ordinarily limited by alternate contact of circumferentially-spaced adjustable stops 93 thereon with the drop picker post 69.

The solid (unslotted) segmental portion of the upper needle cylinder 2 rests directly upon the corresponding solid portion of the lower cylinder 1 and has rabbeted interconnection therewith as shown at 95 in Figs. 4 and 7. As a consequence, the upper cylinder 2 is definitely positioned both vertically and circumferentially relative to the lower cylinder 1 and driven in unison therewith. At its top, the upper cylinder 2 is rotatively engaged in a bearing annulus 96 rigidly supported by diametrically disposed standards 97, 98 from the stationary cover plate 11 hereinbefore mentioned. Lifting of the upper cylinder 2 is prevented by an overlapping hold-down washer 99 secured as shown in Fig. 3 to the top of the bearing annulus 96 by a screw.

The actuating means for the needles 4 of the upper cylinder 2 include a stitch cam 100 which is in direct vertical alignment with the stitch cam 16 for the lower needles 3, an auxiliary lifting cam 101, a clearing cam 102 and a guard cam 103. The stitch cam 100 is secured by screws 106 to a slide 107 with vertical guidance in a block 108 fixed to the underside of the annulus 96. A stem 109 extends upward from the slide 107 and protrudes through the annulus 96, as shown in Figs. 1 and 9, and has a head 110 between which and the top of said annulus is disposed a helical compression spring 111 whereby a lateral lug 112 on said slide is kept in yielding engagement with an adjustable stop screw 113 that determines the normal or operative position of the stitch cam 100. A lever 114 medially fulcrumed on an upstanding bearing 115 on the annulus 96 has an adjustable abutment screw 116 at one end thereof designed to engage the upstanding stem 109 of the cam slide 107. The opposite end of the lever 114 is connected to a vertical thrust rod 117 which is confined to axial movement in the plate 33 and in the guide 38 at the back of the machine and arranged for actuation by another pair of circumferentially-spaced segmental cam rises 118 and 118a on the control drum 42. The clearing cam 102 is attached to the inner end of a radially retractable slide 120 (Figs. 1, 2 and 5) which is confined in a guide block 121 at the underside of the annulus 96 and which is urged inwardly by a spring 122. The outer upturned end 120a of the slide 120 is engaged by a crank 123 at one end of a horizontal rock shaft 125 supported in bearings 126 and 127 on the top of the annulus 96. An adjustable abutment screw 128 in an arm 129 on the opposite end of the rock shaft 125 engages a vertical thrust bar 130 in the path of actuating segmental cams 131 and 131a on the control drum 42. The supplemental cam 101 and the guard cam 103 are fixedly suspended from the annulus 96 by hangers 132 and 133 respectively.

The upper cylinder 2 is devoid of sinkers, the fabric loops formed by its needles 4 being drawn over verges 135 resulting from the radial slotting of a laterally projecting circumferential segmental flange 136a of an annulus 136 at the bottom of said cylinder, said flange lying in a plane separated by a small interval from the tops of the web holders 91 as clearly shown in Fig. 4. Surrounding the lower end of the upper cylinder 2 is a latch guard ring 137 which, see Figs. 2 and 6, is supported by brackets 138 and 139 from the standards 97 and 98. To opposite sides of the point of feeding where a yarn Y is delivered to the needles from an eye 140a at the inner end of a horizontal finger 140, the lower edge of the latch guard ring 137 is recessed upwardly and beveled off as at 141 and 142, 143 in Figs. 11-19. The reason for these provisions will also become apparent from further description, it being important however to observe that the feed point of eye 140a is located circumferentially of the latch guard ring 137 centrally between the cams 15, 16, and that the recesses 141 and 142 are in direct vertical alignment with said cams.

In order to open the latches of the needles of the cylinder 2 immediately previous to their approach to the point of yarn feeding at certain stages of the knitting cycle, I have further provided the machine with a latch opener 144, see Figs. 2 and 6. As shown in Fig. 6, this latch opener 144 has the form of a tapered pin which is arranged tangentially of the cylinder 2, at the upward recession 143 of the latch guard ring 137, and which is guided for retractability axially in a pendent lug 138a on the bracket 138. A finger spring 145 secured to the post 97 has its hooked outer end 145a engaged with the upturned rear end 144a of the latch opener 144 so as to tend to keep the latter in its forward or active position. Also engaging the upturned rear end 144a of the latch opener 144 is a lateral finger projection 146 at the lower end of a shaft 147 which is rockable in the vertically spaced apertured lugs of a bearing piece 148 secured to the post 97 at one side thereof, as best shown in Figs. 2 and 6. At its upper end, the rock shaft 147 has a small crank arm 149 (Fig. 5) coupled by a link 150 with a screw 151 on the carrier slide 120 for the upper needle cam 102, said screw constituting one of the anchorages for the spring 122. As a consequence of the arrangement just described, it will be apparent that the latch opener 144 will be retracted concurrently with each withdrawal of the cam 102.

The yarn guide finger 140 is formed from stout wire with an upright supporting portion 140b and a base loop 140c through which the shank of a headed securing screw 155 passes into the stationary plate 33. The yarn Y is drawn from a suitable source of supply (not illustrated), and en route to the feed finger 140, first traverses a disk tension 156 (Fig. 3), on a horizontal angular bracket arm 157 secured to a fixed post 158, then directly downward through a guide eye 159 at the vertex end of said bracket, then beneath a guide member 160 pendent from said bracket, then through the pigtail loop 161 at the end of a take-up arm 162 pivoted at 163 on said bracket, and finally to a guide eye 165 at the outer end of said finger. As shown in Fig. 3, the take-up arm 162 is subject to a torsion spring 166 which tends to yieldingly urge it outwardly of the machine as considered in Fig. 1, thereby to cause the slack in the yarn Y to be taken up as it occurs and to keep the yarn properly tensioned at all times.

For the purpose of continually ejecting the string work as it is formed in the machine, I have additionally provided mechanism including a plunger rod 170 which extends axially down through the cylinders 1 and 2 and into a tube 171 of smaller diameter internally of the lower cylinder 1, see Fig. 4. The tube 171 is suitably supported from the top of the lower cylinder 1 and reaches well down into the fabric receptacle 172 of the machine. To the lower end of the rod 170 is attached a collar 173 with circumferentially-arranged outwardly and downwardly sloped points 175 for engaging the string work and depressing it. An annular series of inwardly projecting barbs 176 within the tube 171 near the bottom engages the string work at a lower level to keep it from rising with the plunger rod 170 as the latter is occasionally elevated. The rod 170 is slidably guided adjacent its top in the end of an arm 177 (Figs. 1 and 3) affixed to the post 158, and at an intermediate point in a cross piece 178 bridged across the top of the upper needle cylinder 2. Depression of the work is effected by a weight 179 secured to the rod 170 at a point below the guide arm 177; and the elevation of said rod is periodically accomplished through the medium of a lifting lever 180 which is pivoted at 181 on a collar 182 affixed to the post 158 with its free end underreaching said weight. In turn pivotally connected to the lift lever 180 at 183 is a vertical thrust rod 185 having guidance with the other thrust rods previously mentioned in the plates 33 and 38, and having its lower end in the path of segmental actuating cams 186 and 186a on the control drum 42, see Fig. 2.

Figure 22:
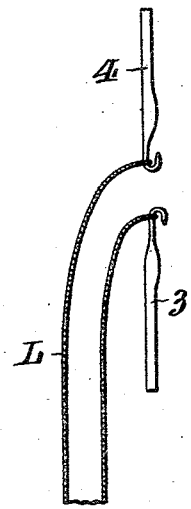
Figs. 22–28 are smaller scale fragmentary sectional views similar to Figs. 20 and 21 but more diagrammatically illustrated showing successive stages of the stocking web formation in the machine.

The operation of the machine is as follows:

During the formation of the tubular leg portion L of a stocking blank, which stage of the knitting is diagrammatically depicted in Fig. 22, the knitting cams are arranged as shown in Figs. 11 and 12, i. e., with the cams 18 and 23 for the lower cylinder needles 3 retracted and the pickers 20—22 out of the range of the needle butts, with the stitch cam 100 for the upper cylinder needles 4 in elevated position and with the latch opener 144 in active position. As the two cylinders concurrently swing in the direction indicated by the arrow in Fig. 11, the upper needles 4 will follow the path shown, with their latches held open by the jacks 5, the upper ends of which trace a path j—j, while passing the recesses 143 and 142 in the latch guard ring 137. As the needles 4 pass beyond the recess 142 and approach the feed, the jacks 5 are depressed by cam 90 and thus allowed to draw loops of the yarn Y over the verges 135 (the level of which is at the line v—v) as said needles are elevated by the stitch cam 100, the loop drawing occurring at the region of the beveled recess 141 of the latch guard ring 137. Incidentally, the lower cylinder needles 3 remain at the depressed level with their butts underpassing the stitch cams 15 and 16 until they are well beyond the stitch forming region of the upper needles 4, whereupon they are elevated by the cam 19. By reason of having their hooks outwardly offset as hereinbefore pointed out in connection with Figs. 20 and 21, it will be seen that the lower cylinder needles 3 will not foul the loops on the upper cylinder needles 4 when they are elevated by the cam 19 as just explained. During the suceeding reverse turn of the cylinders in the direction indicated by the arrow in Fig. 12, the butts of the lower needles 3 pass over the stitch cam 16, then beneath the center cam 17, and finally under the stitch cam 15 whereby said needles, as they pass the feed 140a, are caused to draw fabric loops from the yarn Y over the stitch-drawing ledges of the web holders 91 (the level of which is at the horizontal line w—w), the stitch formation taking place at the recess 142 in the latch guard ring 137. In the meantime, the upper cylinder needles 4, with their latches closed, remain at the high level to which they were previously moved by the stitch cam 100 so as to avoid the yarn Y as they pass the feed 140a, being thereafter depressed by the cam 102 with incidental opening of their latches at the recess 143 in the latch guard ring 137 as they move down through the previously formed loops on them at the verge line v—v. Repetitions of complete reciprocations of the machine in the manner just described results in the production of plain tubular fabric for a stocking leg L.

Figure 23:
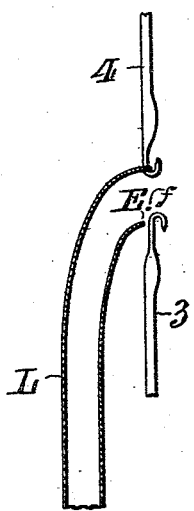
Figure 24:
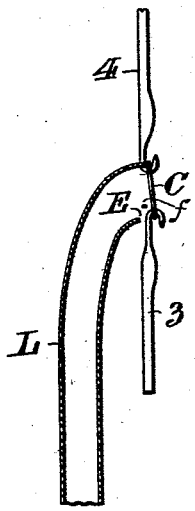
Figure 25:
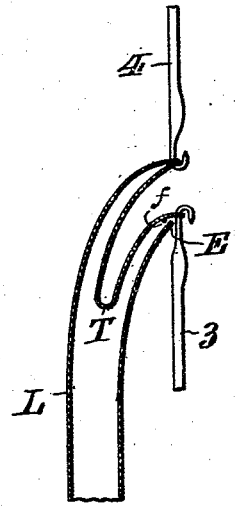
Figure 26:
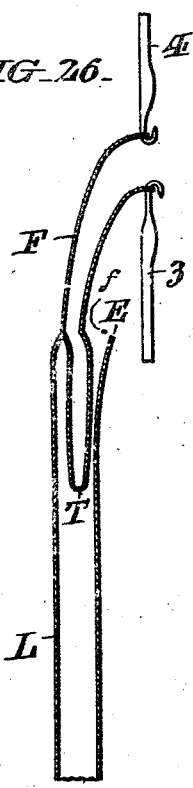
Figure 27:
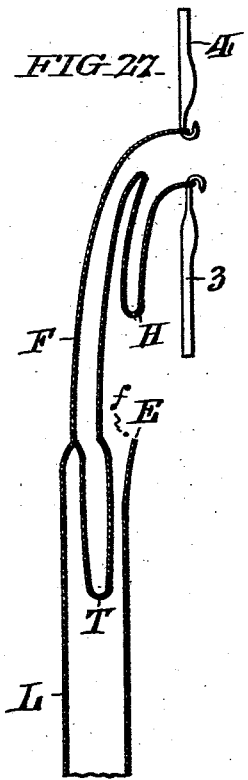
Figure 28:
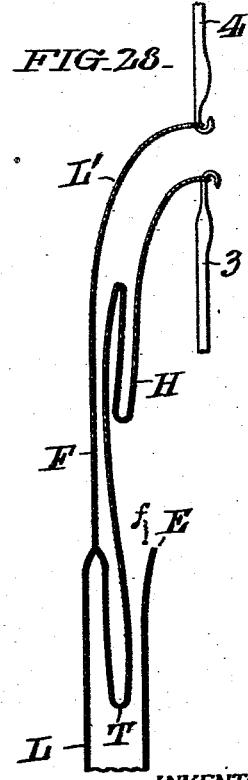

When a sufficient length of leg fabric L has been knitted, and at the completion of a half course on the lower needles 3 as the cylinders turn in the direction of the arrow in Fig. 13, the cam 23 is moved inward to active position, being therefore now shown in full lines. During this stage, the upper needles 4 are prevented from drawing loops from the yarn Y in the same manner as described in connection with Fig. 12. In the succeeding reverse turn of the cylinders 1 and 2 in the direction of the arrow in Fig. 14, another partial course is knitted on the upper needles while the lower needles again pass idly beneath their stitch cams 15 and 16 holding their loops. During the succeeding turn of the cylinders 1 and 2 in the direction of the arrow in Fig. 15, the lower needles are depressed by the cam 23 with the result that they cast the previously formed loops on them and fail to take yarn while the upper needles 4 continue to hold theirs, with attendant formation of a float f (Figs 29, 30, and 31), this stage of the knitting being shown in Fig. 23. At the initiation of the last described turn of the cylinders, the stitch cam 100 for the upper needles 4 was lowered and the cam 18 (now indicated in full lines) was moved into action in readiness to re-elevate the lower needles 3 in preparation to take the yarn Y. Immediately after the needles 3 and 4 have cleared their cams in Fig. 15, the depressing cam 23 for the lower needles 4 is withdrawn or retracted, being accordingly indicated only in broken lines in Fig. 16. As the cylinders next turn in the direction of the arrow in Fig. 16, the butts of the lower needles 3 pass over the top of stitch cam 15, then beneath center cam 17 and finally beneath stitch cam 16 with the result that they are caused to take the yarn Y concurrently with the upper needles 4 so that loops are drawn by both sets of needles at the edge recession 141 of the latch guard ring 137, the loops formed at this time being substantially of normal size due to the changed (lowered) position of the stitch cam 100. As will be seen later the course just completed constitutes the closing course for the toe pocket of a new stocking which is about to be knitted. Upon completion of the last mentioned turn of the cylinders 1 and 2 in Fig. 16, the cams 23, 102 and the latch opener 144 are withdrawn with attendant release to activity of the lift pickers 20 and 21 for operation beginning with the succeeding swing of the cylinders in the direction of the arrow in Fig. 17. Due to retraction of cam 102, the upper needles 4 will be maintained at the raised or idling level while a toe pocket T is fashioned by narrowing and widening on the lower needles 3 only incident to repeated turns of the cylinders 1 and 2 for a time successively in opposite directions as will now be explained. In the narrowing phase, the drop pickers 20 and 21 function to raise individual needles at opposite ends of the series 3 as the cylinders 1 and 2 successively turn in opposite directions. The start of the narrowing phase is shown in Fig. 18 with the cylinders 1 and 2 turning as indicated by the arrow, the left needles 3a of the series 3 having been raised to the idling level by the picker 20. During the succeeding turn of the cylinders in the opposite direction the right-hand end needle 3b of the series 3 will be raised to the idling level by the picker 21. The narrowing phase will thus be carried out in the usual manner well understood by those familiar with the operation of seamless hosiery machines. Throughout the narrowing phase, the drop picker 22 is definitely held in the depressed position in which it is shown in Figs. 17 and 18 so as to be out of the path of the butts of the needles of the series 3 raised by the pickers 20, 21, the finger 77 having at the initiation of this phase dropped off the end of the cam rise 79 on the drum 42 (Fig. 10) with resultant lowering of the finger 74 (Figs. 4 and 8) and engagement thereof with the projection 75 extending from the pivot 71 to effect the downward displacement of said picker. When the picker 22 is so depressed, it cannot be influenced by the segmental cam 86 (Fig. 4) and the intervening elements 80 and 81, and remains quiescent instead of being constantly raised and lowered as ordinarily during each reciprocation of the cylinders. Just before initiation of the toe pocket widening phase which now follows and which is illustrated in Fig. 19, the drum 42 (Fig. 10) is shifted slightly to bring the cam rise 79 beneath the finger 77. As a consequence of this action the finger 74 is elevated to release the drop picker 22, which, under the influence of the torsion spring 79, is urged upward against the guard cam 73 as shown in dotted lines in Fig. 19 and thereby again placed under the control of the segmental cam 86. As the cylinders turn in the direction of the arrow in Fig. 19, the cam 86 operates to keep the picker 22 depressed until the first elevated needle 3b at the right hand end of the series has reached a position immediately above it. During continued movement of the cylinders in the same direction, the butts of the raised needles 3b override the picker 22 and keep it depressed. Finally, however, after being cleared by the butt of the innermost of the raised needles 3b, the picker 22 is elevated by the torsion spring 70 and during movement of the cylinders in the opposite direction it eventually engages the two innermost needles 3b of said raised group and carries them down to the knitting level, one of the needles, lowered as just explained, being re-elevated to the idling level before it reaches the center cam 17 as is ordinarily done in seamless hosiery knitting. Widening continues in this way as the cylinders are oscillated through alternative lowering of raised needles at opposite ends of the series 3 as said cylinders turn in opposite directions until all of the raised needles are again restored to action. At the completion of the toe widening the drum 42 is given another shift until the high portion of the cam rise 79 is brought beneath the lever 77, whereby the drop picker 22 is returned to the idle position which it normally occupies during the knitting of the tubular portions of the fabric. At the same time, the lift pickers 20, 21 are also returned to their normal inactive positions, the upper stitch cam 10 permitted to resume its raised position and the cam 102 reinstated so that the machine is restored to the condition shown in Fig. 11 in readiness to produce the tubular foot portion F of the new stocking blank with both sets of needles in operation in the same manner as hereinbefore explained in connection with the knitting of the leg portion of the first blank. When a sufficient length of tubular fabric for the foot F of the new stocking blank is knit, the upper set of needles 4 is rendered inactive but holding their loops while a heel pocket H is fashioned on the lower needles 3 in precisely the same way as described above for the toe pocket T, whereupon the machine is again placed in condition to produce the tubular leg portion L of the new blank. Throughout the knitting, the yarn Y is maintained under constant tension, the yarn drawn out as a consequence of the excess movement of the cylinders 1, 2 required for cam clearance as they turn alternately in opposite directions is temporarily laid over the plain portion 136b of the annulus 136 (Fig. 4) and subsequently absorbed each time by the take-up 162. At the initiation of each toe and heel fashioning phase, the rod 170 with its spike head 173 is lifted through the medium of the cam rises 186 and 186a on the drum 42 and so held to prevent strain on the fabric at these times. At all other times the rod 170 with its spike head is left free and subject to the weight 179 to maintain the fabric under tension so that it is gently drawn downward and away from the needles 3 and 4. It is of course to be understood that the cam projections on the control drum 42 are so arranged to time the various changes required for successive repetitions of the knitting cycle which I have just described, to the end that the product of the machine takes the form of a string of stocking blanks, such as shown in Figs. 29 and 30 in which the top edge of the leg portion L of one is attached through half its circumference to the next across the toe T of the next at a juncture course C, while the remaining half of the edge is free as at E, and in which a float f of the yarn used in the knitting extends from the ends of the line of juncture.

Separation of a stocking blank from the next on the string is effected by severing an end loop l in Fig. 31 of the connecting juncture course C (of which the loops have been elongated for convenience of illustration) at the point p and pulling upon the float f from the left of the figure to draw out the yarn of said course. After separation of the blank as just explained, the yarn of the float f is severed close at the point p' where it is still attached to the separated blank. If desired or found more convenient in practice, the cuts at p and p' may be made at the same time. It will thus be seen that through my invention it is possible to produce seamless stockings in which toe closing is automatically accomplished during the knitting. This is advantageous not only in that it does away with the costly looping operation which is ordinarily required, but in that the appearance of the stockings is improved by absence of objectional looping lines across the toe tops. The raw top edges of the individual stockings may be secured against ravelling by resorting to a subsequent overedge stitching operation, or the stockings finished by application of separately knitted ribbed tops.

It is to be undertsood that my improved knitting machine is not to be considered as limited to the production of hosiery, since, by modifications within the scope of the appended claims, it can be employed to produce string work composed of other types of separable tubular units which are closed at one or both ends.

Having thus described my invention, I claim:

1. A knitting machine having two opposing sets of alternatingly-arranged independent needles; a yarn feed; means for reciprocating the two needle sets in unison to move alternately in opposite directions past the feed; and means operative at certain times to cause one set of the needles to knit during movement in one direction and the other set to knit during movement in the opposite direction, and at other times to cause both sets to knit during movement in one direction.

2. A knitting machine having two opposing sets of alternatingly-arranged independent needles; a yarn feed; means for reciprocating the two needle sets in unison to move alternately in opposite directions past the feed; and means operative at certain times to cause one set of the needles to knit during movement in one direction and the other set to knit during movement in the other direction, and at other times to render one set of needles idle to hold their loops while knitting proceeds on the other set alone.

3. A rotary seamless stocking knitting machine having two opposing sets of independent needles in alternation with each other and arranged in a semi-circle; a yarn feed; means for actuating the two sets of needles in alternation to take yarn and thereby produce the tubular leg and foot portions of the stockings; and means for controlling one set of the needles to fashion heel and toe pockets during idling of the other set of needles.

4. A seamless stocking knitting machine having two opposing sets of alternatingly-arranged independent needles; means for feeding yarn; means for actuating the two sets of needles in alternation to take yarn and thereby produce the tubular leg and foot portions of the stockings; means for controlling one set of the needles to fashion heel and toe pockets during idling of the other set of needles; and means operative to cause said other set of needles to knit a single course and to hold it until the toe pocket is completed for closure of said pocket.

5. A seamless stocking knitting machine having two opposing sets of alternatingly-arranged independent needles; means for feeding yarn; means for causing simultaneous actuation of both sets of needles to form a starting and toe pocket closing course from the yarn; means for causing one set of the needles to be idled and to temporarily hold the loops of the starting course; means for thereupon causing actuation of the other set of needles alone to fashion a toe pocket; means operative upon completion of the toe pocket to cause actuation of both sets of needles in alternation to form the tubular portion of the stocking foot; means for causing idling of the first set of needles a second time and incidental actuation of said other set alone to fashion a heel pocket; and means operative upon completion of the heel pocket to cause actuation of both sets of needles in alternation to form the tubular leg portion of a stocking.

6. A seamless stocking knitting machine having two opposing sets of alternatingly-arranged independent needles; means for feeding yarn; means for causing simultaneous actuation of both sets of needles to form a starting and toe pocket closing course; means for causing one set of the needles to be idled and to temporarily hold the loops of the starting course; means for thereupon causing actuation of the other set of needles alone to fashion a toe pocket; means operative upon completion of the toe pocket to cause actuation of both sets of needles in alternation to form the tubular portion of the stocking foot; means for causing idling of the first set of needles a second time and incidental actuation of the other set alone to fashion a heel pocket; means operative upon completion of the heel pocket to cause actuation of both sets of needles in alternation to form the tubular leg portion of a stocking; and means operative after the completion of said leg portion to again cause simultaneous actuation of both sets of needles to form a starting and toe closing course for a new stocking.

7. A seamless stocking knitting machine having two opposing sets of alternatingly-arranged independent needles; means for feeding yarn; means for causing simultaneous actuation of both sets of needles to form a starting and toe pocket closing course; means for causing one set of the needles to be idled and to temporarily hold the loops of the starting course; means for causing actuation of the other set of needles alone to fashion a toe pocket; means operative upon completion of the toe pocket to cause actuation of both sets of needles in alternation to form the tubular portion of the stocking foot; means for causing idling of the first set of needles a second time and incidental actuation of the other set alone to fashion a heel pocket; means operative upon completion of the heel pocket to cause actuation of both sets of needles in alternation to form the tubular leg portion of a stocking; means operative after the completion of the leg portion to again cause simultaneous actuation of both sets of needles to form a starting and toe closing course for a new stocking; and means for causing the first set of needles to take thread without knitting it concurrently with pressing off of the loops from the other set of needles preparatory to fashioning of the toe pocket for a new stocking on the last mentioned needles.

8. A seamless knitting machine having two coaxial superposed cylinders each slidably supporting a series of independent needles part way around it, the needles of one set alternating with the needles of the other set; means for oscillating the two cylinders in unison; a yarn feed; and separate cams including stitch cams respectively for actuating the two needle sets, said cams being constructed and arranged to cause one set only of needles to knit the yarn as the cylinders turn in one direction, and to cause the other set of needles only to knit as the cylinders turn in the opposite directions for production of tubular work by the machine.

9. A seamless stocking knitting machine according to claim 8, further comprising lift and drop pickers in association with the knitting cams of one cylinder adapted to cooperate in fashioning heel and toe pockets by the corresponding set of needles; and means for controlling the actuating cams for the other set of needles to prevent knitting of the yarn by them during the fashioning of the heel and toe pockets.

10. A seamless stocking knitting machine according to claim 8, further comprising lift and drop pickers in association with the knitting cams of one cylinder adapted to cooperate in fashioning heel and toe pockets by the corresponding set of needles; control means; means governed by the control means to cause idling of the other set of needles during the fashioning of the heel and toe pockets; and means also governed by said control means for arranging the knitting cams so that both sets of needles are caused to knit simultaneously for a single course at the beginning of the toe pocket for closure of said pocket.

11. A seamless stocking knitting machine according to claim 8, further comprising pickers in association with the knitting cams of one cylinder adapted to cooperate in fashioning heel and toe pockets by the corresponding set of needles; means for controlling the actuating cams for the other set of needles to prevent knitting of the yarn by them during the fashioning of the heel and toe pockets; a weighted element with downward barbs for taking up on the fabric during the production of the tubular portions of the stockings; means for automatically lifting the weighted element at the initiation of each fashioning phase and so holding it to avoid strain on the fabric, and for releasing said element at the conclusion of each fashioning phase to resume its take up function; and means operative to hold down the fabric while the weighted element is being raised as aforesaid.

12. A circular knitting machine having two superposed coaxial cylinders spaced from each other by a relatively narrow horizontal knitting gap; a series of independent needles extending part way around one of the cylinders; a series of opposing needles extending part way around the other cylinder and alternating with those of the first series; means for oscillating the two cylinders in unison; a fixedly-positioned yarn feed; a group of cams constructed and arranged to cause the yarn to be knitted by one set of needles only as the cylinders turn in one direction; another group of cams for actuating the other set of needles; and means for controlling certain cams of the last mentioned group to cause said other set of needles to knit the yarn during certain phases of the knitting only as the cylinders turn in the opposite direction, and during other phases of the knitting to cause said other set of needles to knit the yarn as the cylinders turn in either direction.

13. A circular knitting machine having two superposed coaxial cylinders spaced from each other by a relatively narrow horizontal knitting gap; a series of independent needles extending part way around the lower cylinder; a series of opposing needles extending part way around the upper cylinder and alternating with the lower needles; means for oscillating the two cylinders in unison; a fixedly-positioned yarn feed; a group of cams constructed and arranged to cause the yarn to be knitted by the upper needles only as the cylinders turn in one direction; a group of cams for actuating the lower set of needles; and means for controlling the last mentioned cams to cause the lower needles to knit the yarn during certain phases of the knitting only as the cylinders turn in the opposite direction, and during other phases of the knitting to cause said lower needles to knit the yarn as the cylinders turn in either direction.

14. A knitting machine having two opposing sets of alternatingly-arranged independent latch needles; superposed guiding supports for the respective needle sets separated by a narrow horizontal knitting gap; a fixedly-positioned yarn feed; means for reciprocating the guiding supports in unison to bodily move the two needle sets alternately in opposite directions past the feed; a horizontally-arranged latch guard serving both sets of needles and positioned immediately above the knitting gap; means including stitch and clearing cams and a normally-retracted supplemental depressing cam for the lower needles, said stitch and clearing cams being arranged for actuating said lower needles to knit the yarn only as the guiding supports move in one direction; means including a stitch cam and a retractable clearing cam normally arranged for actuating the upper needles to knit the yarn only as the guiding supports move in the opposite direction; a latch opener normally disposed in the path of the lower needles; and control means operative at certain times during the knitting to move the depressing cam aforesaid into active position to divert the lower needles and so prevent them from taking yarn with attendant casting of previously formed loops from them, and at other times to withdraw the latch opener aforesaid simultaneously with the clearing cam for the upper needles.

15. A circular knitting machine having two superposed coaxial cylinders spaced from each other by a relatively narrow horizontal knitting gap; a series of independent latch needles extending part way around one of the cylinders; an opposing series of latch needles extending part way around the other cylinder and alternating with the needles of the first series; a latch guard surrounding the upper cylinder immediately above the knitting gap and serving both needle sets; a fixedly-positioned yarn feed; means for oscillating the two cylinders in unison; means including stitch and clearing cams and a normally-retracted supplemental depressing cam for the lower needles, said stitch and clearing cams being arranged for actuating said lower needles to knit the yarn only as the cylinders turn in one direction; means including a stitch cam and a retractable clearing cam normally arranged for actuating the upper cylinder needles to knit the yarn only as the cylinders turn in the opposite direction; a latch opener normally disposed in the path of the lower needles; and control means operative at certain times during the knitting to move the depressing cam aforesaid into active position to divert the lower needles and prevent them from taking yarn with attendant casting of previously formed loops from them, and at other times to withdraw the latch opener aforesaid simultaneously with the clearing cam for the upper cylinder needles.

16. A knitting machine having a cylinder which slidably supports a series of needles part way around it; means for oscillating the cylinder; knitting cams for the needles including circumferentially spaced main and auxiliary stitch cams, a top center cam, and a clearing cam adjacent said auxiliary stitch cam so arranged that the needles are actuated normally by the main stitch cam to take yarn fed at a fixed point vertically above said center cam only as the cylinder turns in one direction; lifting and depressing pickers capable of cooperating in the production of fashioned work; a normally-retracted supplemental clearing cam adjacent the main stitch cam adapted to be moved into active position to cause diversion of the needles so that they are actuated by the auxiliary stitch cam during the fashioning phases at the times when the cylinder turns in the direction opposite to that aforesaid; and means for controlling said supplemental clearing cam.

17. A knitting machine having two superposed coaxial cylinders each slidably supporting a series of needles part way around it, the needles of one set being opposed to and alternating with the needles of the other set; means for oscillating the two cylinders in unison; knitting cams for the lower needles including circumferentially spaced main and auxiliary stitch cams, and associated top center and clearing cams so arranged that the needles are actuated normally by the main stitch cam to take yarn fed from a fixed point vertically above said center cam only as the cylinders turn in one direction; knitting cams for the upper needles including a stitch cam positioned vertically above the auxiliary stitch cam for the lower needles, and associated clearing and auxiliary raising cams positioned to the opposite side of the yarn feeding point and so arranged as to cause actuation of the upper needles by the main stitch cam to take yarn only as the cylinders turn in the opposite direction; a normally-retracted supplemental depressing cam associated with the cams for the lower needles, which, when moved to active position, diverts said lower needles so that the latter are actuated by the auxiliary stitch cam aforesaid to take the yarn simultaneously with the upper needles when the cylinders turn in the first mentioned direction; and means for controlling said supplemental cam.

18. A knitting machine having two superposed coaxial cylinders spaced by a relatively narrow knitting gap, each slidably supporting a series of independent latch needles part way around it, the needles of one set being opposed to and alternating with those of the other set; means for oscillating the two cylinders in unison; knitting cams for the lower needles including circumferentially spaced main and auxiliary stitch cams and an associated top center cam; a yarn feed fixedly positioned at the knitting gap vertically above said center cam; knitting cams for the upper needles including a stitch cam positioned vertically above the auxiliary stitch cam for the lower needles; and a latch guard ring surrounding the upper cylinder immediately above the knitting gap and serving both sets of needles, said ring having beveled upward recessions in its lower edge vertically in line respectively with the two stitch cams for the lower cylinder needles.

19. A knitting machine having two superposed coaxial cylinders each slidably supporting a series of latch needles part way around it, the needles of one set being opposed to and alternating with the needles of the other set; a fixedly-positioned yarn feed; means for oscillating the two cylinders in unison; means operative to cause one set of needles to knit the yarn only as the cylinders turn in one direction and the other set to knit the yarn as the cylinders turn in the opposite direction; a latch guard common to both sets of needles; jacks slidably disposed in the lower cylinder intermediate the needles supported in the latter; and means for elevating said jacks so that their upper ends are moved over the latches of the upper needles at the region where the latter are advanced for latch clearance preparatory to taking fresh yarn from the feed.

20. A knitting machine having two superposed coaxial cylinders each slidably supporting a series of needles part way around it, the needles of one set being opposed to and alternating with the needles of the other set; means for oscillating the two cylinders in unison; knitting cams for the lower needles including circumferentially spaced main and auxiliary stitch cams, associated top center and clearing cams, a normally idle lift picker and a spring-biased drop picker, one of said clearing cams being normally retracted so that the main stitch cam causes the lower needles to take yarn from a feed disposed vertically above said center cam only as the cylinders turn in one direction; knitting cams for the upper needles including a stitch cam and a retractable clearing cam normally arranged to cause knitting of the yarn only as the cylinders turn in the opposite direction; control means operative at certain times for withdrawing the upper needle clearing cam to prevent the latter needles from knitting while holding previously formed loops on them, and for moving the normally-retracted lower needle clearing cam into active position so that said lower needles are caused to knit by the auxiliary stitch cam during movement of the cylinders in one direction and by the main stitch cam during movement of the cylinders in the opposite direction incident to fashioning phases by narrowing and widening; a universal pivot supporting means for the lower picker; a segmental edge cam on one of the cylinders; means actuated by said segmental edge cam to depress the drop picker as the cylinders turn in opposite directions during the widening periods until it is overpassed by the outermost needles of each end group raised during the narrowing.

21. A knitting machine having two opposing sets of alternatingly-arranged independent needles; a fixedly-positioned yarn feed; means for bodily reciprocating the two needle sets in unison past the feed; knitting cams including a stitch cam normally arranged to cause one set of needles to take yarn during bodily movement in one direction; knitting cams including a stitch cam normally arranged to cause the other set of needles to take yarn during bodily movement in the opposite direction; control means operative at times to rearrange the cams so that both sets of needles are caused to take yarn during bodily movement in one direction, and to adjust the position of one of the stitch cams so that the loops drawn during the joint actuation of the needles are substantially the same in size as those drawn normally by the individual sets of needles.

22. The method of producing a seamless stocking by reciprocatory knitting upon two sets of opposing needles arranged in alternation with each other, which method comprises forming a starting and toe closing course on both sets of needles; then rendering one set of needles idle to hold the starting course while fashioning a toe pocket on the other set; then forming a tubular foot portion by knitting alternately on the two needle sets; then fashioning a heel pocket on the needles previously employed for the toe pocket while the other set of needles is again idled; then forming a tubular leg portion by again knitting alternately on the two needle sets; then after a sufficient length of leg fabric has been produced, forming a course of loops on said other needle set and preventing the toe and heel pocket producing needles from taking yarn with attendant pressing off of the fabric from the latter needles and floating of the yarn between the ends of such course; and then repeating the above cycle.

23. The method of producing string work after the manner defined in claim 22 from a single continuous yarn.

24. The method of knitting with the aid of two opposing sets of needles by repetitions of a cycle which comprises knitting alternately on the two needle sets for a time to produce tubular fabric; then forming a course of loops on both sets of needles; then forming a course of loops on one set of needles alone while casting the last formed loops on the other set; and then proceeding as before by knitting first on one set of the needles and then on the other to again produce tubular fabric.

25. The method of producing string work after the manner defined in claim 24 from a single continuous yarn.

26. The method of producing knitted string work from a single continuous yarn with the aid of two opposing sets of needles by repetitions of a cycle which comprises knitting alternately on the two sets of needles for a time to form tubular fabric; then forming a course of loops on both sets of needles to close the tube crosswise; then forming a course of loops on one set of needles alone while casting the last formed loops from the other set; and then proceeding as before by knitting first on one set of the needles and then on the other to again form tubular fabric.

GEORGE NORMAN.